UNITED STATES PATENT OFFICE.

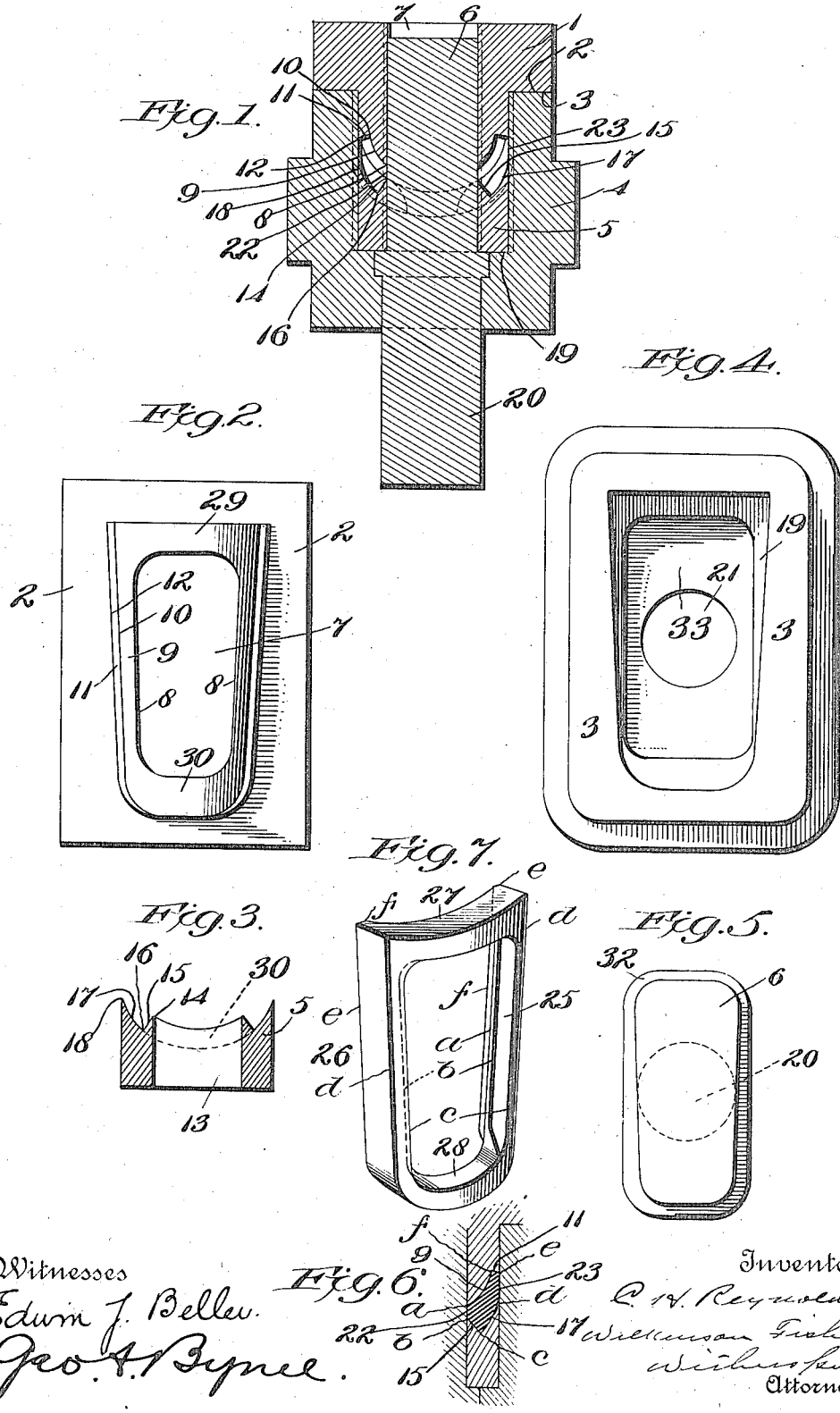

CHARLES H. REYNOLDS, OF ROCHESTER, NEW YORK.

MOLD FOR MAKING PACKING-RINGS.

1,023,761.  Specification of Letters Patent.  Patented Apr. 16, 1912.

Application filed February 4, 1911. Serial No. 606,619.

*To all whom it may concern:*

Be it known that I, CHARLES H. REYNOLDS, a citizen of the United States, residing at Rochester, in the county of Monroe and State of New York, have invented certain new and useful Improvements in Molds for Making Packing-Rings; and I do hereby declare the following to be a full, clear, and exact description of the invention, such as will enable others skilled in the art to which it appertains to make and use the same.

This invention relates to molds for making packing rings for use in connection with valves, and has for its object to produce a mold which will make an oblong tapered ring with facility and at a minimum expense.

To these ends the invention consists in the novel details of construction and combinations of parts more fully hereinafter disclosed and particularly pointed out in the claims.

Referring to the accompanying drawings forming a part of this specification, in which like numerals and letters designate like parts in all the views:—Figure 1 is a sectional view showing the parts assembled and the mold cavity in cross section; Fig. 2 is a plan view on an enlarged scale of the top mold member as seen from below in Fig. 1; Fig. 3 is a sectional view of the bottom mold member removed from its position as shown in Fig. 1; Fig. 4 is a plan view of the outer holding member of the mold with the parts shown in Figs. 2 and 3 removed; Fig. 5 is a plan view of the central cylindrical plug shown in Fig. 1 as passing through the members illustrated in Figs. 2, 3, and 4; Fig. 6 is a detail sectional view of the parts shown in Fig. 1 and illustrating a portion of the ring being molded; and, Fig. 7 is a perspective view of the completed packing rings made in the mold shown in Fig. 1.

1 illustrates a top mold or die member provided with the shoulder 2 fitting the top edge 3 of the hollow holding member 4.

5 represents an inner mold or die member fitting inside the retaining or holding member 4, and 6 represents a plug member or core, oblong in cross section fitting the members 1, 4 and 5, as will be more fully disclosed hereinafter.

The top member 1 is provided with an oblong hole 7 surrounded at one end by the edge 8, and from this edge extends the convexly curved surface 9 terminating at 10 where it is joined by the flat surface 11 terminating at the edge 12, as will be clear from Figs. 1 and 2. The bottom member 5 is likewise provided with an oblong orifice 13 surrounded at one end by the edge 14 from which extends the flat surface 15 joined as at 16 by the concaved surface 17 terminating in the edge 18 surrounding said surface 17. The said upper and lower members 1 and 5 fit snugly inside the holding member 4 as shown, and the lower member 5 seats upon a shoulder 19 in said member 4 as best seen in Fig. 1. The oblong plug shaped member 6 passes through the orifices 7 and 13 in the members 1 and 5; and is provided with a cylindrical extension or shank 20 passing through the orifice 21 in said holding member 4, thereby firmly holding the parts in place.

When the parts are assembled as described, the edges 8 and 14 of the members 1 and 5 fit snugly against the cylindrical surface of the plug 6, leaving a flat surface 22 of said plug constituting a portion of the mold cavity. Likewise, the edge 18 of the member 5 and the edge 12 of the member 1 fit snugly against the inside surface of the holding member 4, and are separated so as to leave the surface 23 of said member 4 to constitute another portion of the mold cavity.

It results from the construction now disclosed that the mold cavity is accordingly made up of the surface 22, of the plug 6, the convex surface 9, and the straight surface 11 of the upper mold member, the surface 23 of the holding member 4, the concave surface 17 of the member 5, and the straight surface 15 of said member. The plug or core 6 is constructed with a shoulder or collar 32 which fits flush within a correspondingly shaped recess 33 in the member 4, and one face of said shoulder lies in intimate contact with the base of the die piece 5. The die member 5 may be moved or driven with respect to the member 1 through the medium of the shank 20, as for instance through the agency of a hydraulic or other press.

The ring illustrated in Fig. 7 is formed in the cavity just described, and consists of the straight members 25 and 26, each of which is provided with the edges *c* and *d*, which are connected by a convex surface formed on the concave surface 17 of the mold, an edge $e$ connected with the edge $d$ by a flat surface formed on the surface 23 of the mold, an edge $f$, best shown on the member 25, connected to the edge $e$ by a flat surface formed on the flat surface 11, of the mold, an edge $a$ connected to the edge $f$ by a concave surface formed on the convex surface 9 of the mold, an edge $b$ connected by a flat surface formed on the surface 22 and a flat surface joining the edges $b$ and $c$ formed on the flat surface 15 of the mold. The said straight members 25 and 26 of the ring are further joined by curved members 27 and 28, which are formed in channels 29 and 30 of the mold cavity, as best illustrated in Fig. 2, and which join the lateral channels of the mold shown in cross section in Fig. 1, as will be readily understood.

In operation the member 1 is removed from the position shown in Fig. 1, and the material of which the ring is to be made is inserted in the oblong annular space between the plug 6 and the member 1. Said member 1 is now replaced and forced down until its shoulder 2 contacts with the edge 3 of the member 4. The mold is then subjected to the required pressure which as heretofore stated is directed against the shank 20 of the plug or core 6. Of course, when dealing with those materials requiring heat to properly set them, the mold may be heated without departing from the principles above disclosed.

It is obvious that those skilled in the art may vary the details of construction and the arrangement of parts without departing from the spirit of my invention, and therefore, I do not wish to be limited to such features except as may be required by the claims.

What I claim is:—

1. In a mold the combination of a retaining member; a die mounted on said retaining member; a second die located and movable within said retaining member; a core engaging with said retaining and die members; and means on said core for engaging with and moving the second die to compress the molded article, substantially as described.

2. In a mold the combination of a retaining member; a die mounted on and projecting within said retaining member; a second die located and movable within said retaining member; a core engaging with said retaining and die members; and a shoulder on said core in contact with the second die member, and a shank on the core; said shoulder adapted to move the second die through said shank to compress the molded article, substantially as described.

3. In a mold the combination of a retaining member; a die located and movable within said retaining member; a second die located and movable within said retaining member; a core engaging with said retaining and die members; and a shoulder on said core in contact with the second die; said shoulder adapted to move the second die through said shank to compress the molded article, substantially as described.

4. In a mold for making packing rings, the combination of a retaining member having a chamber; a member having a die head projecting within said chamber; a second die mounted wholly within and movable within the chamber; a core projecting through the retaining members and the dies; and a shoulder on the core engaging with the second die; said shoulder adapted to move the second die through pressure on the core to compress the molded article, substantially as described.

5. In a mold for making packing rings, the combination of a retaining member having a chamber with a recess in the base thereof; a member having a die head projecting within said chamber; a second die located wholly within and movable within said chamber; a core projecting through said retaining member and the dies; and a shoulder on said core fitting flush within the chamber recess, said shoulder engaging with and adapted to move the second die through pressure on the core to compress the molded article, substantially as described.

6. In a mold for making packing rings, the combination of a holding member provided with a top edge; a portion adapted to form a part of the mold cavity and a seat 19; a lower mold member adapted to fit the interior of said holding member and to rest on said seat, and having a portion forming another part of the mold cavity; a top mold member also fitting the interior of said holding member, supplying still another portion of said mold cavity, and provided with a shoulder adapted to contact with said top edge; each of said members provided with registering orifices which are surrounded by said mold cavity; and a plug member passing through said orifices and supplying still another portion of said mold cavity, substantially as described.

In testimony whereof, I affix my signature, in presence of two witnesses.

CHARLES H. REYNOLDS.

Witnesses:
JOHN M. DYER,
EDMOND P. ROMBAUT.